(12) United States Patent
Shen

(10) Patent No.: US 8,779,743 B2
(45) Date of Patent: Jul. 15, 2014

(54) CONTROL CIRCUITS AND CONTROL METHODS FOR OVER VOLTAGE PROTECTION IN POWER SUPPLIERS

(75) Inventor: Yi-Lun Shen, Taipei City (TW)

(73) Assignee: Leadtrend Technology Corporation, Hsinchu (TW)

(*) Notice: Subject to any disclaimer, the term of this patent is extended or adjusted under 35 U.S.C. 154(b) by 105 days.

(21) Appl. No.: 13/549,799

(22) Filed: Jul. 16, 2012

(65) Prior Publication Data

US 2013/0051086 A1 Feb. 28, 2013

(30) Foreign Application Priority Data

Aug. 26, 2011 (TW) .............................. 100130599 A

(51) Int. Cl.
*H02M 3/156* (2006.01)
(52) U.S. Cl.
USPC ..................... 323/284; 361/91.1; 363/21.13
(58) Field of Classification Search
CPC .............. H02M 3/33523; H02M 3/33507; H02M 3/156; H02M 1/32; H02M 1/34; H03K 17/0822

USPC .......... 363/21.05, 21.13, 56.05, 56.09, 56.11, 363/56.12; 323/284, 285; 361/91.1
See application file for complete search history.

(56) References Cited

U.S. PATENT DOCUMENTS

| | | | |
|---|---|---|---|
| 8,358,117 B1 * | 1/2013 | Chui et al. ...................... 323/283 |
| 2003/0016000 A1 * | 1/2003 | Sanchez ......................... 323/284 |
| 2008/0239766 A1 * | 10/2008 | Trattler ........................ 363/21.05 |
| 2011/0156684 A1 * | 6/2011 | da Silva et al. ............... 323/284 |
| 2011/0241639 A1 * | 10/2011 | Noda ............................ 323/282 |

* cited by examiner

*Primary Examiner* — Matthew Nguyen
*Assistant Examiner* — Alex Torres-Rivera
(74) *Attorney, Agent, or Firm* — McClure, Qualey & Rodack, LLP

(57) ABSTRACT

Disclosed include a control circuit adapted for a power controller powered by an operation voltage. When the operation voltage exceeds an over-voltage reference, the power controller stops power conversion provided by a power converter. The control circuit comprises a slope detector detecting a variation slope of the operation voltage. When the variation slope exceeds a drop rate, the slope detector recovers the power conversion. When the power conversion is recovered the power controller compares the operation voltage with the over-voltage reference.

11 Claims, 4 Drawing Sheets

CONTROL CIRCUITS AND CONTROL METHODS FOR OVER VOLTAGE PROTECTION IN POWER SUPPLIERS

CROSS-REFERENCE TO RELATED APPLICATION

This application claims priority to and the benefit of Taiwan Application Serial Number 100130599, filed on Aug. 26, 2011, which is incorporated by reference in its entirety.

BACKGROUND

The present disclosure relates generally to control circuits and methods adapted for switched mode power supplies, and more particularly to control circuits and methods regarding to over voltage protection in switched mode power supplies.

Power converters are always needed in most electronic devices, to provide adequate power with specific voltage or current that electronic devices require for proper operation. To protect those powering or powered from being damaged by fault operation conditions, most power converters are designed to equip with protection mechanisms, such as over-load protection (OLP), over-temperature protection (OTP), output-short protection (OSP), over-voltage protection (OVP), and the like.

When a feedback loop of a power converter that, to regulate an output voltage, detects the condition of an output voltage is broken, the power converter might mistakenly interpret the output voltage is too low and continue raising its output power, causing the output voltage to rise accordingly. OVP could stop the output voltage from being over high, and prevent those powered by the output voltage from being over stressed.

FIG. 1 illustrates a conventional power converter 8, including flyback topology 10, operation voltage supply 12, and power controller 18. Operation voltage supply 12 provides operation voltage $V_{cc}$ at node VCC, powering power controller 18, which might be in the form of a monolithic integrated circuit. Power converter 8 regulates output voltage $V_{OUT}$ at output node OUT to supply power to load 20.

When a feedback loop that detects the condition of output voltage $V_{OUT}$ at output node OUT is broken, output voltage $V_{OUT}$ might start to increase steadily. Due to the inductive coupling, operation voltage $V_{CC}$ provided by operation voltage supply 12 increases as well. It can be designed that when operation voltage $V_{CC}$ is determined to be over high power controller 18 stops the power conversion provided by power converter 8, such that OVP is achieved.

FIG. 2 exemplifies power controller 18 including oscillator 40, pulse-width modulator 44, OVP control circuit 30, and gate logic 42. Oscillator 40 provides clocks that power controller needs for timing. Pulse-width modulator 44 determines the duty cycle, the ON time of power switch 15 in proportion of a cycle time. OVP control circuit 30 prepares power-good signal $S_{PG}$ to inform gate logic 42 whether operation voltage $V_{CC}$ is good. Gate logic 42 controls power switch 15 via gate node GATE.

FIG. 3A shows operation voltage $V_{CC}$ and power-good signal $Sp_{PS}$ about the time when OVP is triggered due to a broken feedback loop. At the beginning of FIG. 3A, operation voltage $V_{CC}$ is out of regulation and continues to rise. At time point $t_1$ when operation voltage $V_{CC}$ exceeds over-voltage reference $V_{REF-OVP}$, comparator 34 resets SR flip flop 32, power-good signal $S_{PG}$ is deasserted to be "0" in logic, such that gate logic 42 deems operation voltage $V_{CC}$ to be not good and keeps power switch 15 OFF accordingly, stopping the following power conversion. Thus, OVP is triggered.

As the power conversion is stopped, operation voltage $V_{CC}$ starts to decline because that power controller 18 is alive and consumes the power from operation voltage $V_{CC}$. It might be designed that when operation voltage $V_{CC}$ is lower than reference voltage $V_{REF-RSTRT}$ power conversion is restarted or resumed to raise both output voltage $V_{OUT}$ and operation voltage $V_{CC}$. Nevertheless, power-good signal $S_{PG}$ is kept as being "0" in logic until time point $t_2$. As shown in FIG. 3A, at time point $t_2$, operation voltage $V_{CC}$ exceeds reference voltage $V_{REF-UV}$, comparator 36 and single-pulse generator 38 switch power-good signal $S_{PG}$ to be "1" in logic, and gate logic 42 deems operation voltage $V_{CC}$ good from now on. Hold-time $T_{HOLD}$) represents the time period when power conversion is paused or stopped.

FIG. 3B shows operation voltage $V_{CC}$ and power-good signal $S_{PS}$ about the time when OVP is triggered due to voltage noise temporarily occurring at operation voltage node VCC. As shown in FIG. 3B, operation voltage $V_{CC}$ soars at about time point $t_3$ because, for some reasons, voltage noise suddenly occurs at operation voltage node VCC. At time point $t_3$, operation voltage $V_{CC}$ exceeds over-voltage reference $V_{REF-OVP}$, and OVP is triggered. Even though voltage noise subsides soon and operation voltage $V_{CC}$ quickly goes back to its normal value, operation voltage $V_{CC}$ cannot be deemed to be good until operation voltage $V_{CC}$ experiences the similar event sequences shown in FIG. 3A. Namely, operation voltage $V_{CC}$ will decline to reference voltage $V_{REF-RSTRT}$ and then rise to reference voltage $V_{REF-UV}$, as shown in FIG. 3B, such that power-good signal $S_{PG}$ becomes "1" in logic at time point $t_4$. As shown in FIG. 3B, hold-time $T_{HOLD}$ is considerably long.

BRIEF DESCRIPTION OF THE DRAWINGS

The invention can be more fully understood by the subsequent detailed description and examples with references made to the accompanying drawings, wherein.

DETAILED DESCRIPTION

Figure 1:
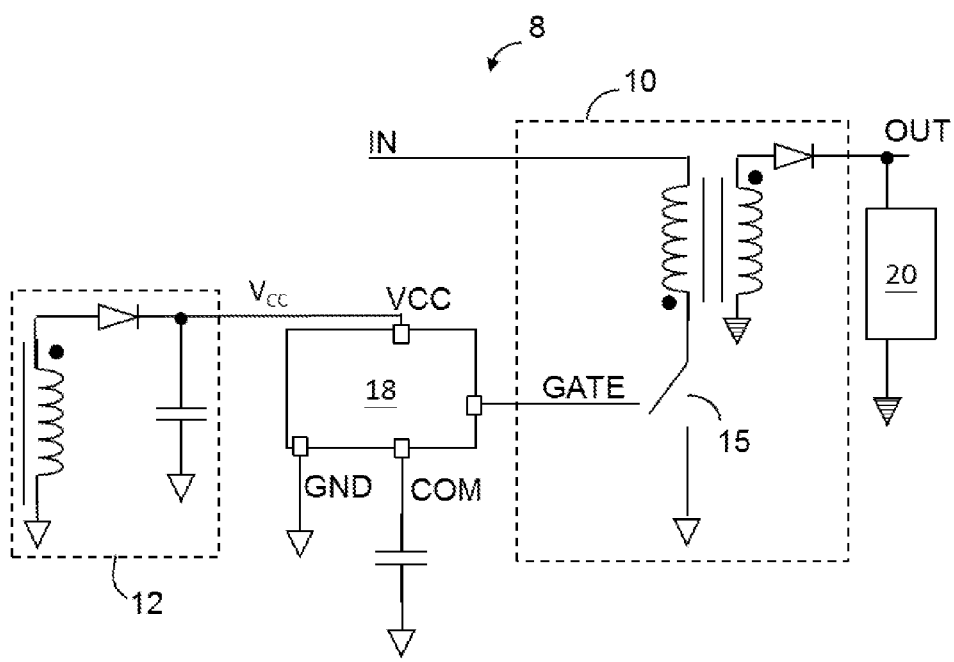
FIG. 1 illustrates a conventional power converter.
Figure 2:
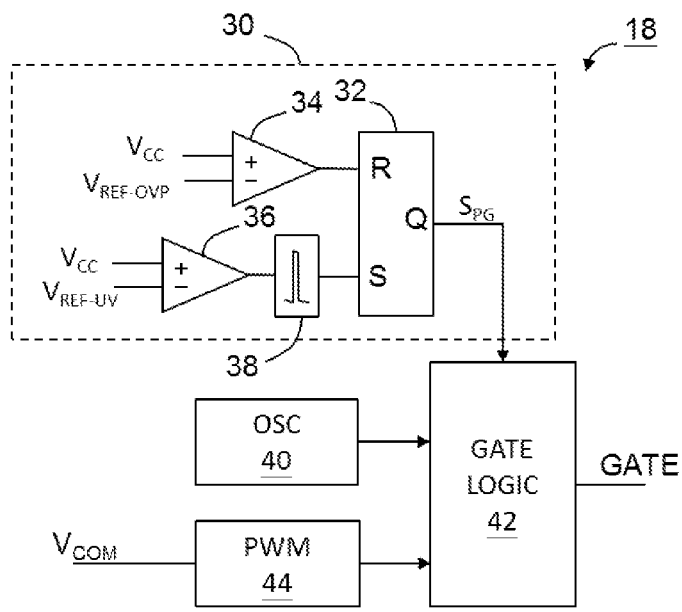
FIG. 2 exemplifies the power controller in FIG. 1.
Figure 4:
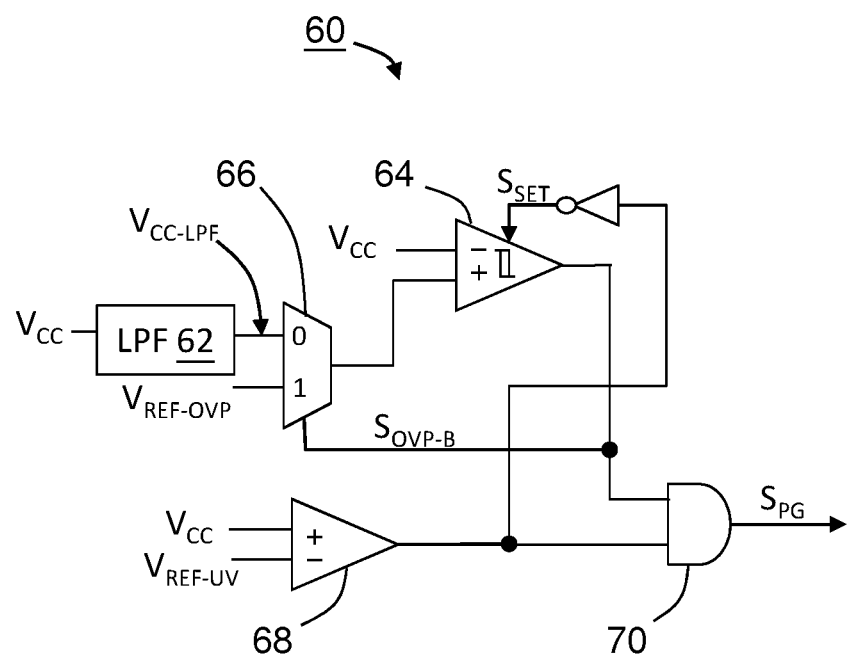
FIG. 4 demonstrates an OVP control circuit according to one embodiment of the invention.

FIG. 4 demonstrates OVP control circuit 60, which, in one embodiment of the invention, replaces OVP control circuit 30 in FIG. 2. OVP control circuit 60 has advantage in recovering power conversion soon after voltage noise subsides, or in shortening hold-time $T_{HOLD}$ during which power conversion is paused or stopped.

OVP control circuit 60 has comparator 64, comparator 68, multiplexer 66, low-pass filter 62, and AND gate 70.

Low-pass filter 62 provides filtered voltage $V_{CC\text{-}LPF}$ by low-passing operation voltage $V_{CC}$. General circuit analysis can support that low-pass filter 62 limits the speed that filtered voltage $V_{CC\text{-}LPF}$ responds to operation voltage $V_{CC}$, and that the difference between filtered voltage $V_{CC\text{-}LPF}$ and operation voltage $V_{CC}$ equivalently corresponds to the variation slope of operation voltage $V_{CC}$. For example, the quicker operation voltage $V_{CC}$ drops, the more filtered voltage $V_{CC\text{-}LPF}$ exceeds operation voltage $V_{CC}$.

When inverted OVP signal $S_{OVP\text{-}B}$ outputted by comparator 64 is "1" in logic, multiplexer 66 couples over-voltage reference $V_{REF\text{-}OVP}$ to the non-inverted input of comparator 64. In the opposite, when inverted OVP signal $S_{OVP\text{-}B}$ is "0" in logic, multiplexer 66 couples filtered voltage $V_{CC\text{-}LPF}$ to the non-inverted input of comparator 64.

Accordingly, if inverted OVP signal $S_{OVP\text{-}B}$ is "1", it implies that operation voltage $V_{CC}$ might not have been too high, and comparator 64 compares operation voltage $V_{CC}$ with over-voltage reference $V_{REF\text{-}OVP}$ to check whether operation voltage $V_{CC}$ is too high at this moment. If inverted OVP signal $S_{OVP\text{-}B}$ is "0", it implies that operation voltage $V_{CC}$ has been too high, and comparator 64 compares operation voltage $V_{CC}$ with filtered voltage $V_{CC\text{-}LPF}$, equivalently detecting the variation slope of operation voltage $V_{CC}$.

In one embodiment, comparator 64 has a hysteresis effect. When inverted OVP signal $S_{OVP\text{-}B}$ is "1", operation voltage $V_{CC}$ need exceed over-voltage reference $V_{REF\text{-}OVP}$ to switch inverted OVP signal $S_{OVP\text{-}B}$ to "0". When inverted OVP signal $S_{SVP\text{-}B}$ is "0", filtered voltage $V_{CC\text{-}LPF}$ need exceed operation voltage $V_{CC}$ a predetermined value, 0.5V for example, to switch inverted OVP signal $S_{OVP\text{-}B}$ to "1". This predetermined value, together with low-pass filter 62, corresponds to a certain drop rate. In other words, comparator 64 and low-pass filter 62 together construct a slope detector detecting the voltage variation of operation voltage $V_{CC}$. When the voltage variation of operation voltage $V_{CC}$ exceeds the certain drop rate, meaning operation voltage $V_{CC}$ drops quicker than the certain drop rate, comparator 64 switches inverted OVP signal $S_{SVP\text{-}B}$ to "1" in logic.

Comparator 68 compares operation voltage $V_{CC}$ with reference voltage $V_{REF\text{-}UV}$. If operation voltage $V_{CC}$ is lower than reference voltage $V_{REF\text{-}UV}$, comparator 68 asserts set signal $S_{SET}$ to set comparator 64, such that inverted OVP signal $S_{SVP\text{-}B}$ is forced to be "1" in logic, and, as a result, comparator 64 is forced to compare operation voltage $V_{CC}$ with over-voltage reference $V_{REF\text{-}OVP}$.

Only when operation voltage $V_{CC}$ has a value between over-voltage reference $V_{REF\text{-}OVP}$ and reference voltage $V_{REF\text{-}UV}$, it is possible for AND gate 70 to provide asserted power-good signal $S_{PG}$, informing gate logic 42 that operation voltage $V_{CC}$ is good. Otherwise, power-good signal $S_{PG}$ is "0" in logic, meaning the operation voltage $V_{CC}$ is not good.

Figure 5A:
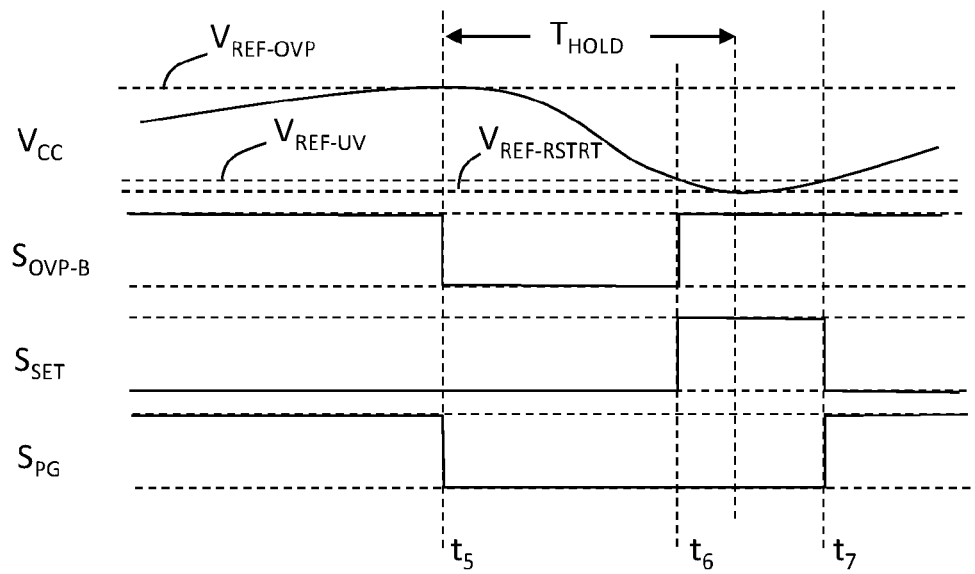
FIG. 5A shows operation voltage $V_{CC}$, inverted OVP signal $S_{OVP-B}$, set signal $S_{SET}$, and power-good signal $S_{PS}$ of FIG. 4, about the time when OVP is triggered due to a broken feedback loop.

FIG. 5A shows operation voltage $V_{CC}$, inverted OVP signal $S_{SVP\text{-}B}$, set signal $S_{SET}$, and power-good signal $S_{PS}$ of FIG. 4, about the time when OVP is triggered due to a broken feedback loop. At the beginning of FIG. 5A, operation voltage $V_{CC}$ is out of regulation due to a broken feedback loop and continues to rise. Inverted OVP signal $S_{OVP\text{-}B}$ is "1" in logic, representing that operation voltage $V_{CC}$ is lower than over-voltage reference $V_{REF\text{-}OVP}$.

At time point $t_5$, operation voltage $V_{CC}$ exceeds over-voltage reference $V_{REF\text{-}OVP}$. Comparator 64 switches inverted OVP signal $S_{OVP\text{-}B}$ to "0" in logic. Thus power good signal $S_{PG}$ becomes "0" in logic, informing gate logic 42 that operation voltage $V_{CC}$ is not good, such that power switch 15 maintains at an OFF state and power conversion is stopped.

After time point $t_5$, operation voltage $V_{CC}$ declines mildly. As the voltage variation of operation voltage $V_{CC}$ is relatively small, inverted OVP signal $S_{OVP\text{-}B}$ remains as being "0" in logic.

At time point $t_6$, operation voltage $V_{CC}$ is lower than reference voltage $V_{REF\text{-}UV}$ to assert set signal $S_{SET}$. Accordingly, comparator 64 is forced to compare operation voltage $V_{CC}$ with over-voltage reference $V_{REF\text{-}OVP}$ and makes inverted OVP signal $S_{OVP\text{-}B}$ "1" because operation voltage $V_{CC}$ is lower than over-voltage reference $V_{REF\text{-}OVP}$ at this moment. Please note that power good signal $S_{PG}$ is still "0" in logic, and power conversion is still stopped.

When operation voltage $V_{CC}$ is lower than reference voltage $V_{REF\text{-}RSTRT}$ gate logic 42 restarts and power conversion is resumed or recovered to raise both output voltage $V_{OUT}$ and operation voltage $V_{CC}$.

At time point $t_7$ operation voltage $V_{CC}$ exceeds reference voltage $V_{REF\text{-}UV}$ and power good signal $S_{PG}$ is switched to be "1" in logic, informing gate logic 42 that operation voltage $V_{CC}$ at present is good.

Figure 3A:
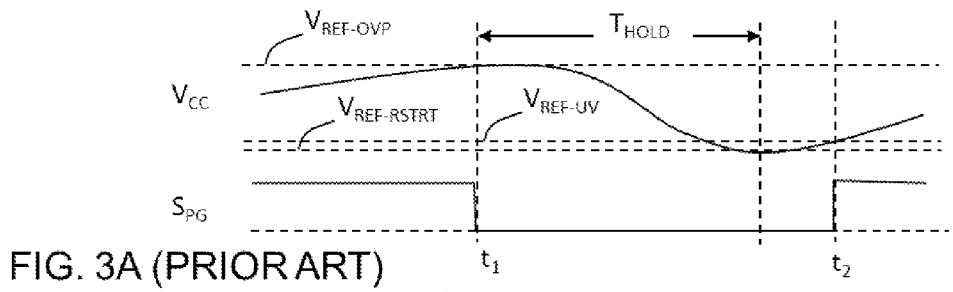
FIG. 3A shows operation voltage $V_{CC}$ and power-good signal $S_{PS}$ of FIG. 2 about the time when OVP is triggered due to a broken feedback loop.

Power good signal $S_{PG}$ of FIG. 5A is substantially the same with that of FIG. 3A. Accordingly, OVP control circuit 60 of FIG. 4 provides substantially the same OVP function as OVP control circuit 30 of FIG. 2 does.

Figure 3B:
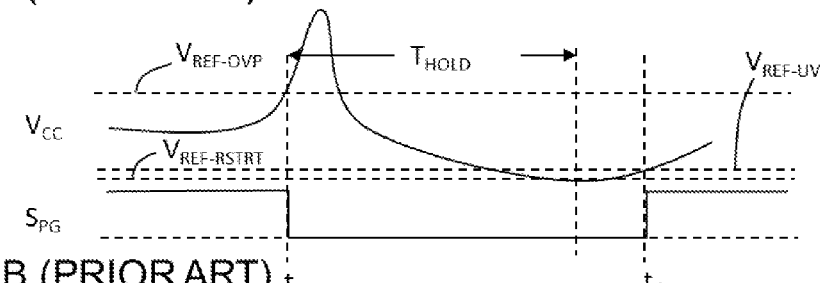
FIG. 3B shows operation voltage $V_{CC}$ and power-good signal $S_{PS}$ about the time when OVP is triggered due to voltage noise temporarily occurring at operation voltage node VCC.
Figure 5B:
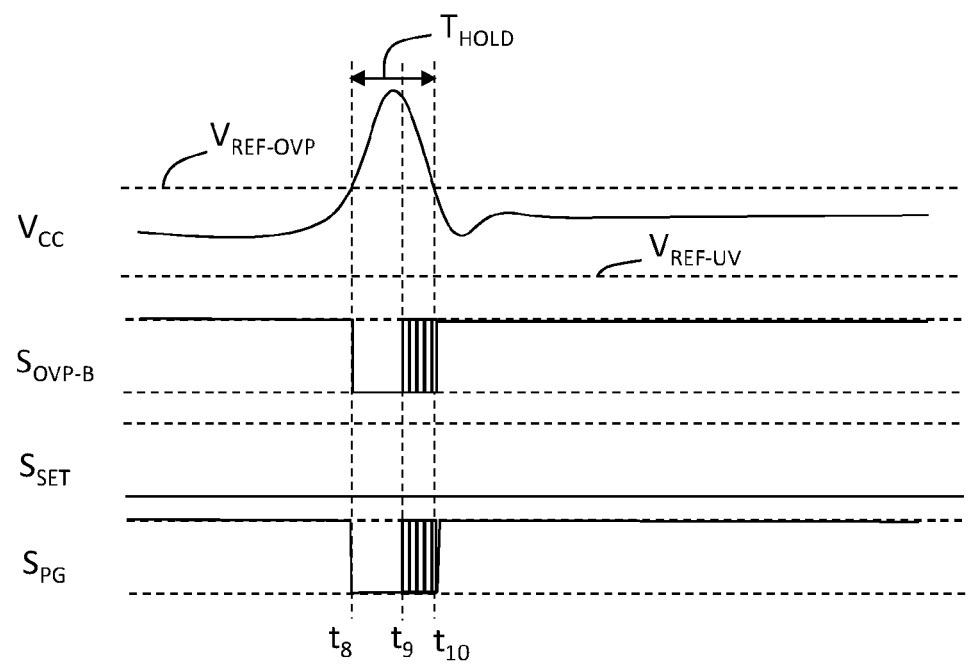
FIG. 5B shows operation voltage $V_{CC}$, inverted OVP signal $S_{OVP-B}$, set signal $S_{SET}$, and power-good signal $S_{PS}$ of FIG. 4, about the time when OVP is triggered due to voltage noise temporarily occurring at operation voltage node VCC.

FIG. 5B shows operation voltage $V_{CC}$, inverted OVP signal $S_{SVP\text{-}B}$, set signal $S_{SET}$, and power-good signal $S_{PS}$ of FIG. 4, about the time when OVP is triggered due to voltage noise temporarily occurring at operation voltage node VCC. In contrary to the lengthy hold-time $T_{HOLD}$ in FIG. 3B, hold-time $T_{HOLD}$ in FIG. 5B is relatively short, meaning that power conversion could be resumed to become normal soon after voltage noise subsides. In comparison with the waveform of operation voltage $V_{CC}$ in FIG. 3B, the waveform of operation voltage $V_{CC}$ in FIG. 5B is much flatter, resulting in better voltage regulation.

Operation voltage $V_{CC}$ soars at about time point $t_8$ because, for some reasons, voltage noise occurs at operation voltage node VCC. At time point $t_8$, operation voltage $V_{CC}$ exceeds over-voltage reference $V_{REF\text{-}OVP}$, both inverted OVP signal $S_{OVP\text{-}B}$ and power-good signal $S_{PG}$ becomes "0" in logic, and power conversion is stopped. Hold-time $T_{HOLD}$ starts.

Operation voltage $V_{CC}$ tends to quickly regain its normal value after voltage noise subsides. In the period from time point $t_9$ to time point $t_{10}$, operation voltage $V_{CC}$ drops quicker than the certain drop rate defined by comparator 64 and low-pass filter 62, such that inverted OVP signal $S_{OVP\text{-}B}$ is switched to "1" in logic, forcing comparator 64 to compare operation voltage $V_{CC}$ with over-voltage reference $V_{REF\text{-}OVP}$. Nevertheless, at this moment, operation voltage $V_{CC}$ is still higher than over-voltage reference $V_{REF\text{-}OVP}$, such that inverted OVP signal $S_{OVP\text{-}B}$ will be switch back to "0" in logic. As a result, inverted OVP signal $S_{OVP\text{-}B}$ continues to toggle between "0" and "1" in logic. So does power-good signal $S_{PG}$, as shown in FIG. 5B. As power conversion is recovered very briefly, very little power, if any, is converted and operation voltage $V_{CC}$ continues to drop and regain its normal value.

After time point $t_{10}$, operation voltage $V_{CC}$ is surly lower than over-voltage reference $V_{REF\text{-}OVP}$. Both inverted OVP signal $S_{OVP\text{-}B}$ and power-good signal $S_{PG}$ stay at "1" in logic. Power conversion starts to properly work, claiming the end of hold-time $T_{HOLD}$ in FIG. 5B.

It can be found from FIG. 5B that power-good signal $S_{PG}$ is stabilized to be "1" in logic soon after voltage noise subsides. According, hold-time $T_{HOLD}$ of FIG. 5B is very short.

The result shown in FIG. 5B also demonstrates that OVP control circuit 60 of FIG. 4 provides better output voltage regulation than OVP control circuit 30 of FIG. 2 does.

In another embodiment of the invention, a high-pass filter is used to detect the voltage variation of operation voltage $V_{CC}$, and a comparator determines whether the voltage variation exceeds a certain drop rate, to perform the functionality similar with what OVP control circuit 60 of FIG. 4 provides.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for over-voltage protection adapted for a power controller controlling a power converter regulating an output voltage to supply power to a load, comprising:
    detecting an operation voltage, wherein the operation voltage powers the power controller;
    detecting a variation slope of the operation voltage;
    comparing the operation voltage with an over-voltage reference;
    comparing the variation slope of the operation voltage with a drop rate;
    stopping power conversion provided by the power converter when the operation voltage exceeds the over-voltage reference; and
    recovering the power conversion when the variation slope exceeds the drop rate.

2. The control method as claimed in claim 1, comprising:
    providing a comparator;
    making the comparator detect the variation slope after the operation voltage exceeds the over-voltage reference; and
    making the comparator compare the operation voltage with the over-voltage reference after the variation slope exceeds the drop rate.

3. The control method as claimed in claim 2, comprising:
    comparing the operation voltage with an under-voltage reference; and
    making the comparator compare the operation voltage with the over-voltage reference when the operation voltage is lower than the under-voltage reference.

4. The control method as claimed in claim 2, wherein the comparator has a hysteresis effect.

5. The control method as claimed in claim 1, further comprising:
    low-pass filtering the operation voltage to generate a filtered voltage;
    comparing the filtered voltage with the operation voltage;
    recovering the power conversion when the filtered voltage is a predetermined value higher than operation voltage.

6. A power control circuit in a power converter, the power converter regulates an output voltage to supply power to a load, the power control circuit comprising:
    a slope detector, wherein the slope detector detects a variation slope of an operation voltage, and the operation voltage powers the power control circuit, wherein the slope detector comprises:
    a first comparator, wherein the first comparator selectively compares the operation voltage with an over-voltage reference, and the variation slope with a drop rate;
    wherein the power control circuit stops the power conversion provided by the power converter when the operation voltage exceeds the over-voltage reference; and
    wherein the power control circuit recovers the power conversion provided by the power converter when the variation slope exceeds the drop rate.

7. The control circuit as claimed in claim 6, wherein the slope detector further comprises:
    a low-pass filter, wherein the low-pass filter provides a filtered voltage according to the operation voltage;
    the first comparator having a first input coupled to the operation voltage, and a second input coupled to the filtered voltage;
    wherein the first comparator renders the power conversion to be recovered when the filtered voltage is a predetermined value higher than the operation voltage.

8. The control circuit as claimed in claim 7, wherein the slope detection includes:
    a multiplexer, comprising:
    a first node coupled to the filtered voltage;
    a second node coupled to the over-voltage reference;
    a select node coupled to an output node of the first comparator; and
    a multiplexer output coupled to the second input of the first comparator.

9. The control circuit as claimed in claim 7, wherein the first comparator has a hysteresis effect.

10. The control circuit as claimed in claim 8, comprising:
    a second comparator, wherein the second comparator compares the operation voltage with an under-voltage reference;
    wherein the multiplexer select the over-voltage reference to be output at the multiplexer output when the operation voltage is lower than the under-voltage reference.

11. The control circuit as claimed in claim 7, further comprising:
    a second comparator, wherein the second comparator compares the operation voltage with an under-voltage reference;
    wherein the second comparator resets the first comparator when the operation voltage is lower than the reference voltage.

* * * * *